United States Patent
Wilson et al.

(10) Patent No.: US 11,227,248 B2
(45) Date of Patent: Jan. 18, 2022

(54) FACILITATION OF COGNITIVE CONFLICT RESOLUTION BETWEEN PARTIES

(71) Applicant: INTERNATIONAL BUSINESS MACHINES CORPORATION, Armonk, NY (US)

(72) Inventors: John D. Wilson, League City, TX (US); Shikhar Kwatra, Durham, NC (US); Paul Krystek, Highland, NY (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 137 days.

(21) Appl. No.: 16/107,056

(22) Filed: Aug. 21, 2018

(65) Prior Publication Data
US 2020/0065728 A1 Feb. 27, 2020

(51) Int. Cl.
*G06Q 10/06* (2012.01)
*G06K 9/00* (2006.01)
*G06N 20/00* (2019.01)
*G06Q 50/18* (2012.01)

(52) U.S. Cl.
CPC ..... *G06Q 10/0637* (2013.01); *G06K 9/00335* (2013.01); *G06N 20/00* (2019.01); *G06Q 50/182* (2013.01); *G06Q 50/188* (2013.01)

(58) Field of Classification Search
CPC combination set(s) only.
See application file for complete search history.

(56) References Cited

U.S. PATENT DOCUMENTS

| | | | |
|---|---|---|---|
| 7,272,575 B2 | 9/2007 | Vega | |
| 7,343,295 B2 | 3/2008 | Pomerance | |
| 7,529,679 B1 | 5/2009 | Pomerance | |
| 7,953,219 B2 | 5/2011 | Freedman et al. | |
| 9,442,916 B2 * | 9/2016 | O'Sullivan | G06F 40/169 |
| 9,514,499 B1 * | 12/2016 | Kogut-O'Connell | G06Q 10/06 |
| 9,552,587 B2 * | 1/2017 | Naqvi | G06Q 30/0269 |
| 10,007,921 B2 * | 6/2018 | Movellan | G06N 20/00 |

(Continued)

FOREIGN PATENT DOCUMENTS

| | | | | |
|---|---|---|---|---|
| CA | 2489304 C | * | 3/2011 | H04L 29/06 |
| WO | WO-2004102328 A2 | * | 11/2004 | G06Q 30/06 |
| WO | 2012143834 A1 | | 10/2012 | |

OTHER PUBLICATIONS

E. Bellucci and J. Zeleznikow, "A comparative study of negotiation decision support systems," Proceedings of the Thirty-First Hawaii International Conference on System Sciences, 1998, pp. 254-262 vol. 1, doi: 10.1109/HICSS.1998.653106. (Year: 1998).*

*Primary Examiner* — Crystol Stewart
(74) *Attorney, Agent, or Firm* — Griffiths & Seaton PLLC (57) ABSTRACT

Embodiments for facilitating cognitive conflict resolution between parties by a processor. An appropriateness of communications, behavior, actions or events associated with one or more users may be cognitively interpreted according to a plurality of identified contextual factors during a conflict resolution. One or more corrective actions may be suggested to mitigate a possible negative impact of the communications, behavior, actions or events upon the one or more users if the interpreted appropriateness is less than a predetermined threshold.

15 Claims, 6 Drawing Sheets

(56) References Cited

U.S. PATENT DOCUMENTS

| | | | | |
|---|---|---|---|---|
| 10,162,844 B1* | 12/2018 | McCord | ............... | G06F 16/2264 |
| 2002/0035480 A1* | 3/2002 | Gordon | ............... | G06Q 50/182 |
| | | | | 705/309 |
| 2003/0014265 A1* | 1/2003 | Landry | ............... | G06Q 50/182 |
| | | | | 705/309 |
| 2004/0059596 A1 | 3/2004 | Vaidyanathan et al. | | |
| 2005/0171917 A1* | 8/2005 | Femenia | ............... | G06Q 10/10 |
| | | | | 705/80 |
| 2010/0131328 A1* | 5/2010 | DeLugas | ............... | G06Q 10/00 |
| | | | | 705/80 |
| 2010/0332287 A1* | 12/2010 | Gates | ............... | G06Q 30/0203 |
| | | | | 705/7.32 |
| 2013/0095460 A1 | 4/2013 | Bishop | | |
| 2013/0144681 A1 | 6/2013 | Quast | | |
| 2013/0305169 A1* | 11/2013 | Gold | ............... | G06Q 10/10 |
| | | | | 715/757 |
| 2013/0339256 A1 | 12/2013 | Shroff | | |
| 2014/0270109 A1* | 9/2014 | Riahi | ............... | G06N 20/00 |
| | | | | 379/88.01 |
| 2016/0042648 A1* | 2/2016 | Kothuri | ............... | A63F 13/213 |
| | | | | 434/236 |
| 2016/0180737 A1* | 6/2016 | Clark | ............... | G06F 3/0481 |
| | | | | 434/236 |
| 2016/0328988 A1* | 11/2016 | Gil | ............... | G10L 25/63 |
| 2016/0358094 A1* | 12/2016 | Fan | ............... | G06N 20/00 |
| 2017/0132215 A1* | 5/2017 | Baughman | ............... | G06F 40/30 |
| 2017/0243133 A1* | 8/2017 | Zavesky | ............... | G06N 20/00 |
| 2019/0012605 A1* | 1/2019 | Rajagopal | ............... | G06Q 10/0637 |
| 2019/0236485 A1* | 8/2019 | Stanley, III | ............... | G06N 20/00 |
| 2019/0355043 A1* | 11/2019 | Swierk | ............... | G10L 15/1815 |
| 2020/0051189 A1* | 2/2020 | Williams | ............... | G06Q 50/18 |

\* cited by examiner

FACILITATION OF COGNITIVE CONFLICT RESOLUTION BETWEEN PARTIES

BACKGROUND OF THE INVENTION

Field of the Invention

The present invention relates in general to computing systems, and more particularly to, various embodiments for facilitating cognitive conflict resolution between parties by a processor.

Description of the Related Art

In today's society, consumers, business persons, educators, and others use various computing network systems with increasing frequency in a variety of settings. The advent of computers and networking technologies have made possible the increase in the quality of life while enhancing day-to-day activities. For example, processing devices, with the advent and further miniaturization of integrated circuits, have made it possible to be integrated into a wide variety of devices. As great strides and advances in technologies come to fruition, the greater the need to make progress in these systems advantageous for efficiency and improvement.

SUMMARY OF THE INVENTION

Various embodiments for facilitating cognitive conflict resolution between parties by a processor, are provided. In one embodiment, by way of example only, a method for facilitating cognitive conflict resolution between parties, again by a processor, is provided. An appropriateness of communications, behavior, actions or events associated with one or more users may be cognitively interpreted according to a plurality of identified contextual factors during a conflict resolution. One or more corrective actions may be suggested to mitigate a possible negative impact of the communications, behavior, actions or events upon the one or more users if the interpreted appropriateness is less than a predetermined threshold.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As a preliminary matter, computing systems may include large scale computing called "cloud computing," in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

The Internet of Things (IoT) is an emerging concept of computing devices that may be embedded in objects, especially appliances, and connected through a network. An IoT network may include one or more IoT devices or "smart devices", which are physical objects such as appliances with computing devices embedded therein. Examples of network-enabled appliances or devices may include computers, smartphones, laptops, wearable devices, sensor devices, voice-activated devices, face-activated devices, digital assistants, home appliances, audio systems, televisions, security cameras, security sensors, among countless other examples. Such IoT computing systems may be employed in a variety of settings.

For example, IoT devices may be employed in a variety of scenarios including, for example, use in improving the quality of communication and civility amongst various entities (e.g., person, business, organization, government, etc.). Quite often, there occurs a scenario in which two parties (individual or a group) are engaged in a discussion that might reach a hostile point in the conversation. The repercussions of such a situation can vary from disagreements, quarrels, hostile behavior, and/or even illegal conduct that creates a hazard to another person's safety and overall health. For example, such hostility or negative behavior may cause a person to seek counseling and/or even cause married parties to seek a divorce, and/or further increase current levels of hostility such as, for example, engaging in additional disputes during an arbitration hearing.

Accordingly, various embodiments are provided herein for facilitating cognitive conflict resolution between parties. In one aspect, the present invention may cognitively interpret an appropriateness (or inappropriateness) of communications, behavior, actions or events associated with one or more users according to a one or more identified contextual factors during a conflict resolution. One or more corrective actions may be suggested to mitigate a possible negative impact of the communications, behavior, actions or events upon one or more users if the interpreted appropriateness is less than a predetermined threshold.

In an additional example, the present invention may monitor a discussion between two or more parties and may intervene at an appropriate time and in the appropriate way with the goal of appeasing the parties engaged in a hostile disagreement and mitigate the risk to each party. Also, the present invention may analyze audible communications, body language, biometric data, micro expressions/facial expression, or other detectible data relating to each party to determine risk factors at thresholds sent or provided by a user. One or more parties (e.g., one or both parties engaged in the hostile behavior or even a mediator attempting to resolve the conflict) may be notified of a relative risk threshold has been reached.

Given certain privacy concerns (both personally to a user or legally required by law), one or more mitigation or "corrective" actions may be suggested to mitigate the current risk without having to record any of the communications after the audible communications, body language, biometric data, facial expression, or other detectible data relating to each party, thus providing privacy of the actual event (e.g., a counseling session, arbitration, legal hearings, business negotiation, etc.). For example, the present invention may be applied during one or move various types of legal proceedings where the parties involved in the legal proceeding may be required (by law or court order) to resolve the legal proceeding by binding arbitration. In this context, for example, two or more parties and an arbiter may be involved and located within a selected room during an arbitration hearing or where the parties are in separate rooms and the arbiter goes back and forth between the rooms trying to reach a consensus.

When both parties remain calm and open (e.g., positive/appropriate behavior and communication), an agreement may be successfully reached or agreed upon between the two or more parties. However, if one or more of the parties begins to display negative, disagreeable, and/or hostile communication or behavior (e.g., the party becomes emotional such as, for example, angry, upset, disappointed, etc.). The negative reaction displayed by the person may cause the conflict resolution meeting (e.g., the arbitration hearing) to increase in both time and expense. Given the amount of time that may be required for a person to return from an irrational behavior/thinking state to a rational behavior/thinking state, the present invention may be employed to proactively prevent and/or quickly de-escalated the negative emotional/hostile state of one or more parties. Thus, the mechanisms of the illustrative embodiments provide for being cognitively aware of escalating negative emotions and behavior while providing various, customized corrective actions to mitigate any risk while optimizing the efficacy and speed of a conflict resolution process (e.g., arbitration hearing, counseling session, various legal proceedings, etc.).

As used herein, so-called "appropriateness" or "inappropriateness" of communications, behavior, actions or events associated with one or more users, may be subjective and context dependent. For example, one solution for an appropriate level of communications, behavior, actions or events settings may be interpreted and evaluated to be either satisfactory or unsatisfactory depending on the user profile of each user. For example, the appropriateness of communications may include emotional stress levels, aggression, hostility, level of passive aggressiveness, behavior, cognitive state, and the like. Said differently, an appropriate level of communications, behavior, actions or events settings may be interpreted, evaluated, and/or defined according to learned emotional stress levels, aggression, hostility, level of passive aggressiveness, behavior, cognitive state, and the like for particular circumstances. For example, appropriate communication may include speaking quietly during a negotiations while speaking loudly (e.g., yelling) may be determined to be inappropriate based on the context, environment, and setting during the negotiations. Accordingly, the so-called "appropriateness" of a particular level of communications, behavior, actions or events may depend greatly upon contextual factors, such as a user profile, environmental factors, age/maturity levels, biometric data, a health profile, emotional data, emotional stress levels, aggression, hostility, level of passive aggressiveness, cognitive state, previously learned and identified hostile behavior, positive/negative behavior, hazardous behavior, and other contextual factors. A deeper, cognitive analysis of the user and levels of the illumination and sound characteristic settings may be provided to further understand the user and/or interpret the appropriate level of satisfaction.

It should be noted as described herein, the term "cognitive" (or "cognition") may be relating to, being, or involving conscious intellectual activity such as, for example, thinking, reasoning, or remembering, that may be performed using a machine learning. In an additional aspect, cognitive or "cognition may be the mental process of knowing, including aspects such as awareness, perception, reasoning and judgment. A machine learning system may use artificial reasoning to interpret data from one or more data sources (e.g., sensor based devices or other computing systems) and learn topics, concepts, and/or processes that may be determined and/or derived by machine learning.

In an additional aspect, cognitive or "cognition" may refer to a mental action or process of acquiring knowledge and understanding through thought, experience, and one or more senses using machine learning (which may include using sensor based devices or other computing systems that include audio or video devices). Cognitive may also refer to identifying patterns of behavior, leading to a "learning" of one or more events, operations, or processes. Thus, the cognitive model may, over time, develop semantic labels to apply to observed behavior and use a knowledge domain or ontology to store the learned observed behavior. In one embodiment, the system provides for progressive levels of complexity in what may be learned from the one or more events, operations, or processes.

In additional aspect, the term cognitive may refer to a cognitive system. The cognitive system may be a specialized computer system, or set of computer systems, configured with hardware and/or software logic (in combination with hardware logic upon which the software executes) to emulate human cognitive functions. These cognitive systems apply human-like characteristics to convey and manipulate ideas which, when combined with the inherent strengths of digital computing, can solve problems with a high degree of accuracy (e.g., within a defined percentage range or above an accuracy threshold) and resilience on a large scale. A cognitive system may perform one or more computer-implemented cognitive operations that approximate a human thought process while enabling a user or a computing system to interact in a more natural manner. A cognitive system may comprise artificial intelligence logic, such as natural language processing (NLP) based logic, for example, and machine learning logic, which may be provided as specialized hardware, software executed on hardware, or any combination of specialized hardware and software executed on hardware. The logic of the cognitive system may implement the cognitive operation(s), examples of which include, but are not limited to, question answering, identification of related concepts within different portions of content in a corpus, and intelligent search algorithms, such as Internet web page searches.

In general, such cognitive systems are able to perform the following functions: 1) Navigate the complexities of human language and understanding; 2) Ingest and process vast amounts of structured and unstructured data; 3) Generate and evaluate hypotheses; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and cognition; 10) Identify resonating, human-like attributes and traits from natural language; 11) Deduce various language specific or agnostic attributes from natural language; 12) Memorize and recall relevant data points (images, text, voice) (e.g., a high degree of relevant recollection from data points (images, text, voice) (memorization and recall)); and/or 13) Predict and sense with situational awareness operations that mimic human cognition based on experiences.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities, but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
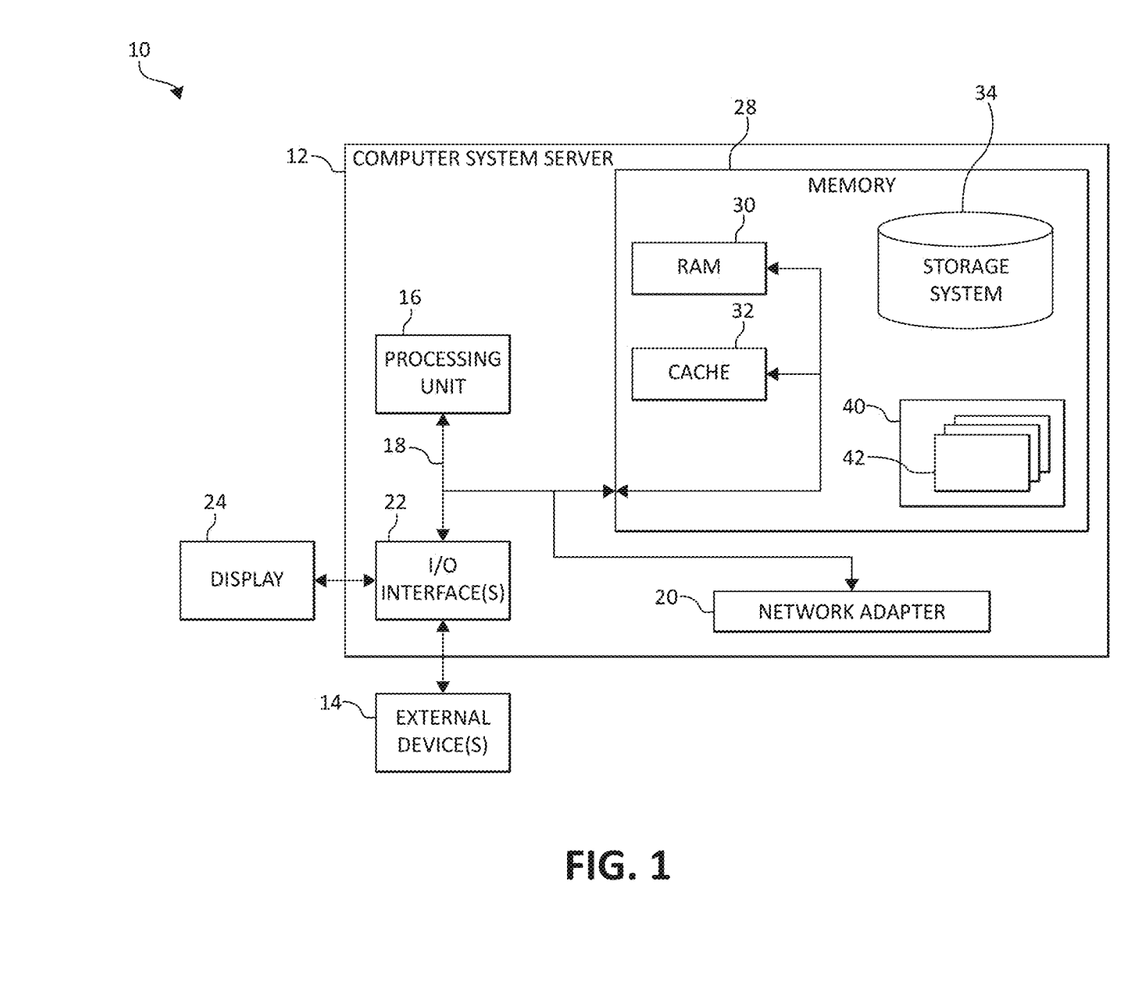
FIG. 1 is a block diagram depicting an exemplary cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
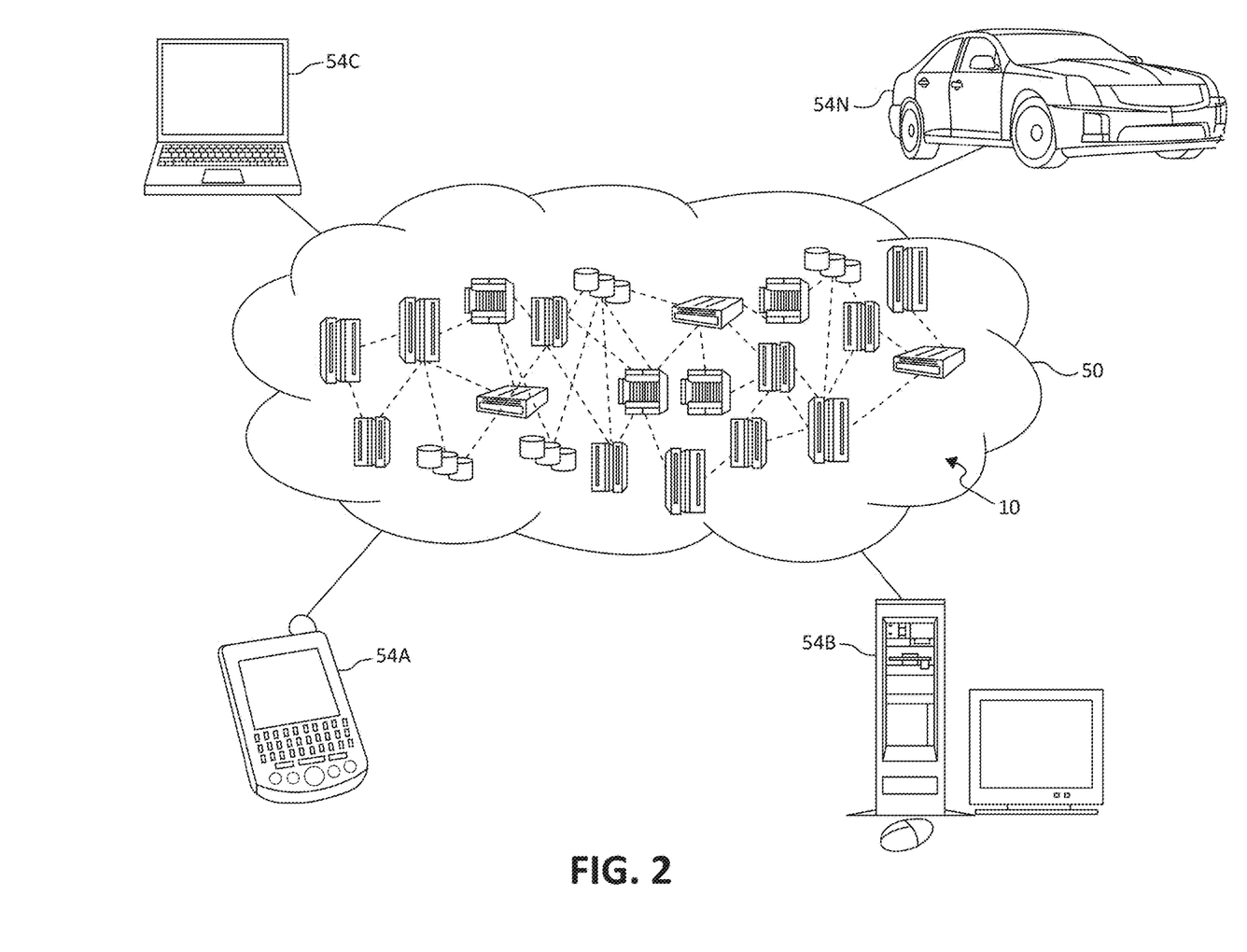
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
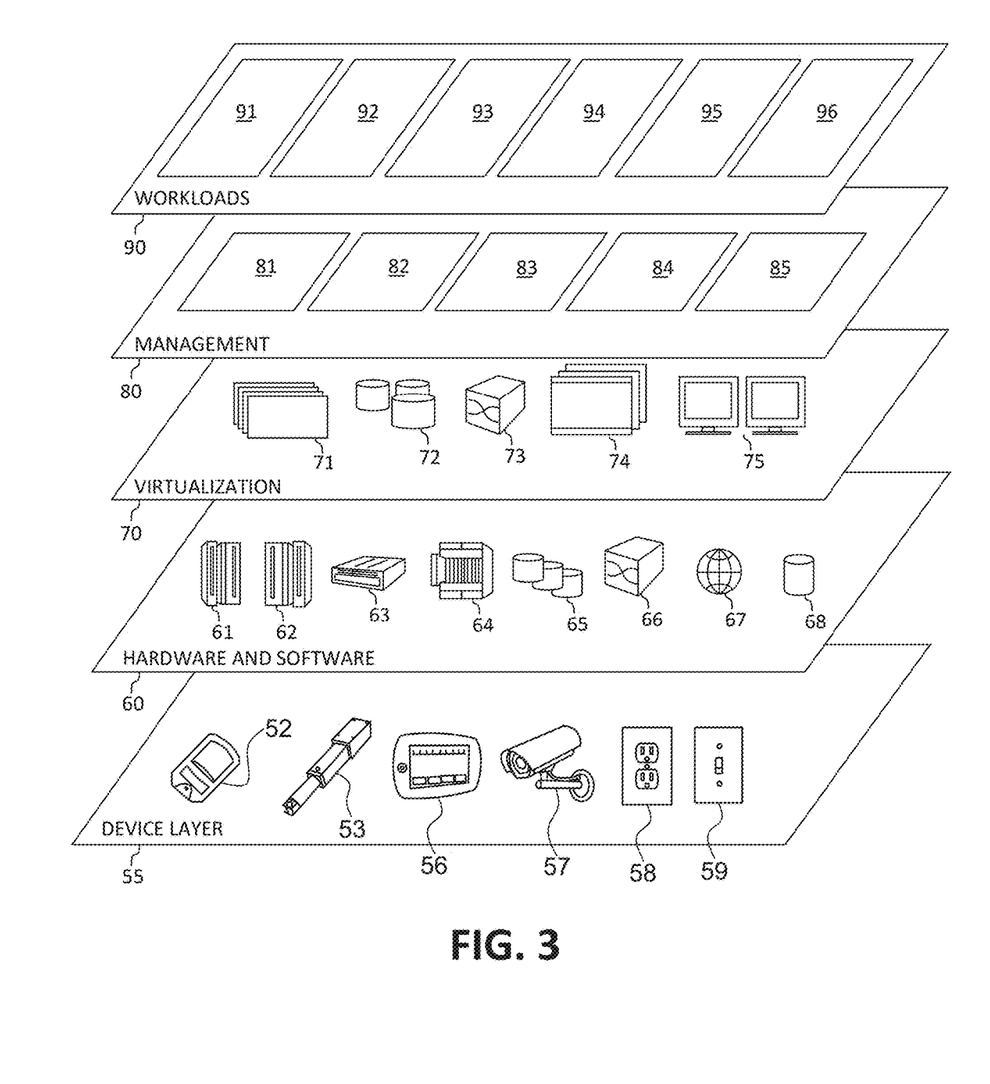
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for facilitating cognitive conflict resolution. In addition, workloads and functions 96 for facilitating cognitive conflict resolution may include such operations as data analysis, machine learning (e.g., artificial intelligence, natural language processing, etc.), user analysis, IoT computing device characteristic parameters, as will be further described. One of ordinary skill in the art will appreciate that the workloads and functions 96 for facilitating cognitive conflict resolution may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the mechanisms of the illustrated embodiments provide novel approaches for the facilitating cognitive conflict resolution to safeguard a user against communications, behavior, actions or events having a possible negative impact upon one or more entities. These mechanisms include functionality that interprets the content of a particular communication, behavior, action and/or event, during a conflict resolution scenario, in terms of identified contextual factors, verifies an "appropriateness" or "inappropriateness" of the communication, behavior, action and/or event, and alerts one or more parties of corrective actions cognitively determined to mitigate a risk and/or possible negative impact upon the one or more entities.

These mechanisms may use, in one embodiment, several identified contextual factors such as, for example, a user profile (e.g., a person involved in counseling, arbitration, legal proceeding, etc.), the type of audience/parties, time and location, and the like. The appropriateness checking functionality may be made against multifaceted factors such as, for example, country-specific laws, organizational policies, a set of policies/rules, culturally/socially acceptable or unacceptable behavior, ethical and emotional impacts, historical data (e.g., cognitively learned appropriate and/or inappropriate communication and/or behavior), determined negativity, and the like. The mechanisms are, among other aspects, rules driven, and the development of these rules may be based on interpretation of data of particular communications, behaviors, actions and/or events. In one embodiment, the rules may be adjusted towards sentiment analysis (e.g., opinion/negativity/emotional state/hostility/ etc. of a particular communication) based on organizational, social, or jurisdictional-specific rules or laws, geographic location, policies, or other factors. A variety of cognitive, interpretive analysis in the context of a given communication, behavior, action and/or event may be utilized. Additionally, the mechanisms of the illustrated embodiments may consider still other factors such as social attributes/influence of all parties involved that may be used to determine the ultimate impact of a particular communication, behavior, action and/or event, for example.

In view of the foregoing, the mechanisms of the illustrated embodiments provide, among other aspects, a cognitive mechanism to analyze and interpret the legal, ethical, moral, and courteous aspects of communication, behavior, action and/or events to determine "appropriateness" in the given context (e.g., an arbitration hearing). In addition, the mechanisms provide a methodology for integrating the author-audience profiles and the type of communication and topic of communication collectively. As another aspect, the mechanisms provide a representational scheme for context specific rules that verify the appropriateness or inappropriateness of the communication, as well as a methodology to collect potential feedback/reaction to the communication, behavior, action and/or event to modify the applicable analytical policies, rules, and/or corrective actions to mitigate the potential harm to a user.

The mechanisms of the illustrated embodiments provide a solution for facilitating cognitive conflict resolution between parties. For example, an arbitration hearing/proceeding between an arbiter and other parties may be monitored using one or more IoT devices such as, for example, using natural language processing and machine learning. A video device (e.g., a video camera, etc.) may monitor and detect if the parties begin or have a proclivity to engage in aggressive/ hostile behavior; physically destruction actions, or a combination thereof. For example, one or more microexpressions that may indicated a sign of hostility may be detected and analyzed. In one aspect, a microexpression may be a brief, involuntary facial expression that is shown on the face of humans according to the emotions that are being experienced (e.g., disgust; anger; fear, sadness, happiness, surprise, and contempt). For example, microexpressions may include, but not limited to, brows being raised or curved, skin below the brow being stretched, horizontal wrinkles across the forehead, eyelids opened wide, a jaw/mouth opens, lower jaw juts outward, lips pressed firmly together, vertical lines appear between the brows, brows are lowered and drawn together, lower/upper lip raised, nose wrinkles, nostrils are dilated, eyes are bulging and/or staring, crows feet near the outside of the eyes, wrinkle runs from outer nose to outer lip, corners of the lips are drawn back and up/down, on side of the mouth is raised or lowered, lower lip pouts out; inner corners of the eyebrows are drawn in and then up, and other types of microexpression that be learned, defined, or provided. A video device may also detect if an arbitration is escalating towards a hostile point, disengagement, and/or an emotional state of one or more users (e.g., upset, angry, hostile, or other emotion.).

A determination operation may be performed to identify a level of risk (e.g., a seriousness of the situation) to the health state, emotional state, or cognitive state of the user and a risk threshold may be determined. One or more corrective or mitigating actions (e.g., previously learned cognitive corrective actions on similar situations) may be recommended and applied such as, for example, a corrective action having a most effective action to mitigate and/or de-escalate the conflict. Those of the one or more corrective actions having a greatest amount of effectiveness in minimizing the possible negative impact of the communications, behavior, actions or events upon the one or more users may be identified, learned, recorded, and/or stored (for subsequent use). One or more corrective actions may be applied to intervene in the arbitration to mitigate the possible negative impact of the inappropriate communication, aggressive/hostile behavior, physically destruction actions, or a combination thereof upon the one or more users in the arbitration to de-escalate the situation in order to pacify the parties engaged in the dispute or disagreement.

In one aspect, the corrective actions may include, but not limited to the following. 1) The corrective actions may include a recommendation to execute a timeout (e.g., an amount of time based on seriousness, hostility, and/or negatively emotional state). 2) The corrective actions may include a recommendation to refocus on a win-win goal of this particular arbitration. 3) The corrective actions may include playing music, which may be soothing, calming, and/or a personal favorite of a party. 4) The corrective actions may include initiating, providing, and/or ordering a food/nutritional item for consumption during the session/arbitration hearing. 5) The corrective actions may include a recommendation to change an arbiter/counselor to an alternative arbiter/counselor. Moreover, the various corrective actions may include defined or learned actions that may mitigate the possible negative impact of the inappropriate communication, aggressive/hostile behavior, physically destruction actions, or a combination thereof upon the one or users. In one aspect, the corrective actions may be provided to the user and the user may select, via on or more IoT computing devices, one or more the selections. The user'choices may be entered into a database. A cognitive (NLP) natural language processing operation may automatically record the user's choices based on the type of corrective actions employed (visual, audio processing with cognitive understanding of techniques used).

Figure 4:
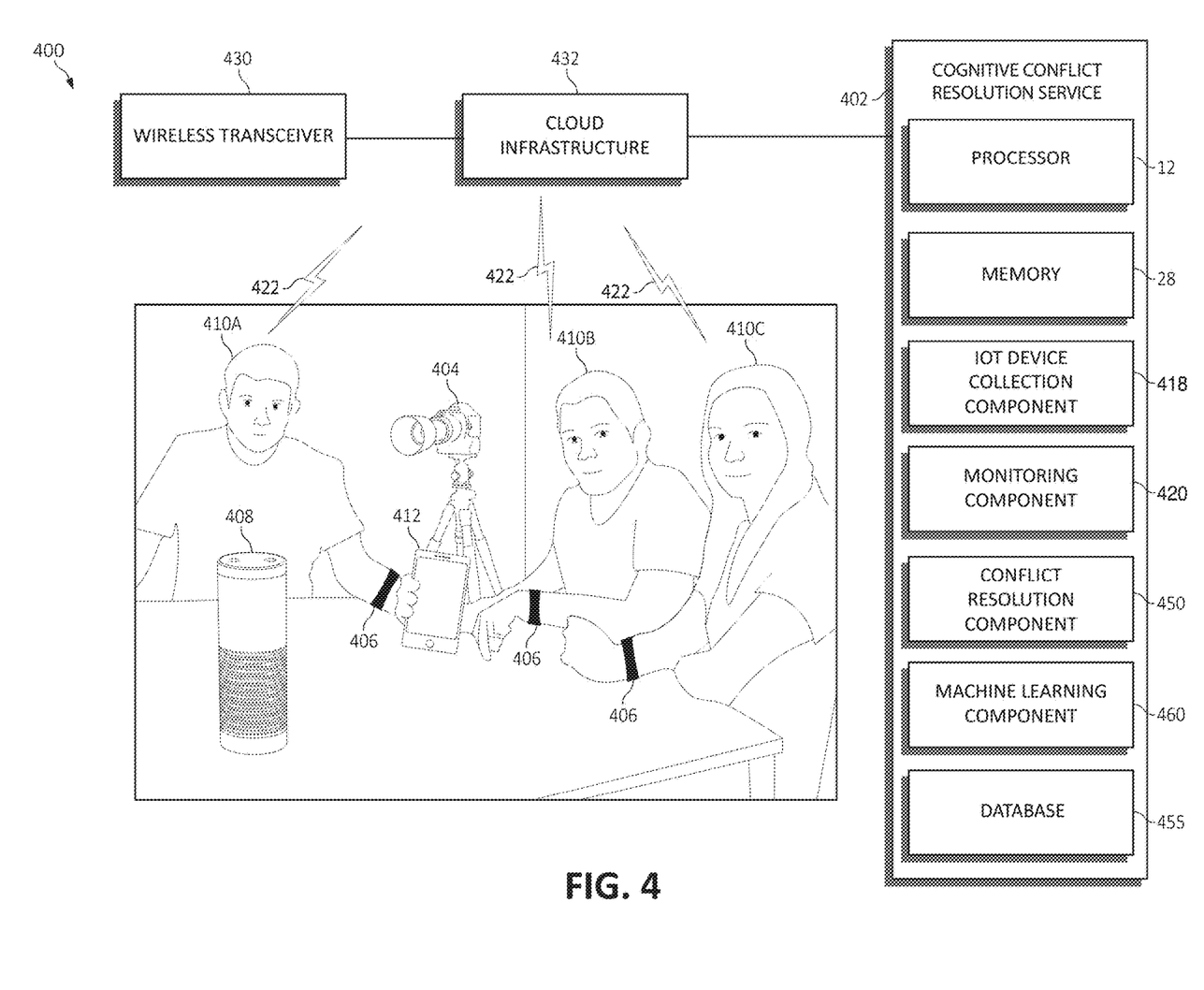
FIG. 4 is an additional block diagram depicting an exemplary functional relationship between various aspects of the present invention.

Turning now to FIG. 4, a block diagram depicting exemplary functional components 400 according to various mechanisms of the illustrated embodiments, is shown. As shown, the various functionality, or "modules" of functionality, hardware devices, and/or other components in the same descriptive sense as has been previously described in FIGS. 1-3 may be included in FIG. 4. For example, processing unit 12 and memory 28 of FIG. 1 may be employed in FIG. 4 to perform various computational, data processing, storage and other functionality in accordance with various aspects of the present invention.

The system 400 may include functional components such as a cognitive conflict resolution service 402, having an IoT device collection component 418, a monitoring component 420, a conflict resolution component 450, and/or a machine learning component 460, each of which may work in communication with each other.

The cognitive conflict resolution service 402 may perform one or more calculations for cognitive conflict resolution according to mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

The cognitive conflict resolution service 402 may be in communication with one or more IoT devices such as, for example, audio/visual device 404 (e.g., camera, recorder, etc.), one or more wearable devices 406 (e.g., a smart watch), a voice activated hub 408 (e.g., personal assistant device), and/or a user equipment ("UE") 412 (e.g., a wireless communication device such as a smart phone, laptop, tablet, computer, etc.). The one or more one or more IoT devices such as, for example, audio/visual device 404, wearable device 406, the voice activated hub 408 (e.g., personal assistant device), and/or the UE 412 may be used as monitoring devices.

The IoT device collection component 418 may be used to monitor, observe, harvest, collect, and store personal data, behavior, biometric data (e.g., facial expressions, heart rate, etc.) in the database 455. The IoT device collection component 418 may identify, collect, and process data relating to age of the user, medical history, financial conditions, status of employment, a social media user profile, social media communication patterns, favorable and unfavorable interests, food preferences, profile types and characteristics of persons associated with the user, an emotional state of the user, biometric data, behavior patterns, or a combination thereof.

The data collected by the IoT device collection component 418 from the IoT devices such as, for example, the audio/visual device 404, the wearable device 406, the voice activated hub 408, and/or a UE 412 may be wirelessly transmitted via a wireless transceiver 430 via a cloud computing infrastructure 432 to the cognitive conflict resolution service 402 via network 422. The monitoring component 420, in association with the IoT device collection component 418, may monitor the communications, behavior, actions or events of the one or more users 410A-C.

The conflict resolution component 450 may cognitively interpret an appropriateness and/or inappropriateness of communications, behavior, actions or events associated with one or more users according to a plurality of identified contextual factors during a conflict resolution. For example, the conflict resolution component 450 may interpret legal, ethical, moral, behavioral, emotional, dangerous, hazards, hostility, or courteous ones of the contextual factors in view of the communications, behavior, actions or events as part of cognitively interpreting an appropriateness or inappropriateness.

In view of the functionality of the conflict resolution component 450, a variety of factors should be considered to evaluate the "appropriateness," such as, and not limited to, (1) a person's relationship to one or more additional parties (e.g., a married couple going through an arbitration hearing required in a divorce, an employee negotiating a raise, a counselor assisting a person suffering from one or more mental or physical challenges, and so forth), (2) the platform where the message is posted (audience) or, for example, relationship to an arbitrator or counselor, (3) the time and place information, (4) policies and laws applicable (such as employment policies, laws applicable to a certain geographical location, or other applicable standards), and (5) offensive, hostile, hazardous, or incendiary communication, behavior, or action that may be considered by the system to never be appropriate at any time or place, irrespective of the user's role, position, etc. These aforementioned policies, and other related information may be provided from a variety of sources (local, government, media, search engines, and a host of other sources, for example) to the appropriateness conflict resolution component 450.

The conflict resolution component 450 may analyze related and similar communications, behaviors, actions or events to determine if an identified contextual factor in the related and similar communications, behaviors, actions or events is similar to one of the identified contextual factors in the communications, behaviors, actions or events. During the monitoring and analysis operations, the conflict resolution component 450 may also identify an increase in hostility, a negative emotional response, or combination thereof of one user (e.g., user 410A) in response to the communications, behavior, actions or events of another user (e.g., user 410B).

The conflict resolution component 450 may suggest and/or apply one or more corrective actions to mitigate a possible negative impact of the communications, behavior, actions or events upon the one or more users if the interpreted appropriateness is less than a predetermined or defined threshold. In one aspect, the conflict resolution component 450 may determine a selected threshold for determining the particular appropriateness. For example, the conflict resolution component 450 may compare the communications, behaviors, actions or events against the selected threshold for acceptable appropriateness of the communications, behaviors, actions or events. If the communications, behaviors, actions or events are above the than a predetermined or defined threshold, the communications, behaviors, actions or events may be identified as inappropriate (e.g., hostile, hazardous, and/or having a potential to negatively impact a health or emotional state of another person).

In one aspect, the conflict resolution component 450 may implement a series of corrective actions to de-escalate the possible negative impact of the communications, behavior, actions or events upon the one or more users based on the identified contextual factors. For example, classical or soothing music may be played, a timeout (e.g., separation of the users 410A and 410B, an encouragement or reminder (e.g., an email, or alert notification to the UE of each party 410A and 410B) may be provided to focus on a win-win goal of the particular arbitration, and/or dynamically ordering delivery of food and/or beverages to de-escalate the inappropriate communication, aggressive/hostile behavior, physically destruction actions, or a combination thereof upon the one or more users 410A and/or 410B.

The machine learning component 460 may initialize a machine learning operation to collect feedback data from the one or more users 410A-C, learn the one or more corrective actions, and/or learn the one or more corrective actions having a greatest amount of effectiveness in minimizing the possible negative impact of the communications, behavior, actions or events upon the one or more users. The collected data from the IoT device collection component 418 may be used to train a machine learning classifier by the machine learning component 460 that recognizes each of the identified communications, behaviors, actions or events. The conflict resolution component 450, in association with the machine learning component 460, may also track a sequence of communications, behaviors, actions or events, performed by an entity, using a machine learning classifier.

The machine learning component 460 may include using one or more heuristics and machine learning based models for performing one or more of the various aspects as described herein. In one aspect, the IoT device compliance service and machine learning based models may be performed using a wide variety of methods or combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, back propagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are considered to be within the scope of this disclosure. Also, when deploying one or more machine learning models, a computing device may be first tested in a controlled environment before being deployed in a public setting. Also even when deployed in a public environment (e.g., external to the controlled, testing environment), the computing devices may be monitored for compliance.

In view of the various components and functionality of FIG. 4, consider the following application steps of the present invention. 1) One or more camera sensors may be integrated with a voice activated hub that may monitor an arbitration hearing occurring between two or more persons. 2) Communication, behavior, and/or activities or events of the user may be monitored to identify an escalation in hostility, a negative behavioral response, and/or an increase in a negative emotional state according to a threshold scale of seriousness (e.g., identified communication, behavior, or actions less than a threshold may be identified as inappropriate). For example, on or more cognitive identification operations may be employed such as, for example, a voice stress analysis, NLP keyword classification (e.g., negative communication vs. increased use of incendiary/offensive communication), a measurement of tone or speech inflection of the communication in order to detect early signals of confrontation, hostility, incendiary/offensive, or hazardous communication, behavior, or actions, increased amounts of gesticulations increasing over time, facial micro-expressions indicating various levels of escalated emotion and the type of emotions, increased heat rate/pulse, pacing of a user, bodily tremors/shakes, rapid movements of one or more extremities of a user (e.g., shaking a hand repeatedly towards another user), and/or other type of identification data.

3) One or more corrective actions may be employed such as, for example, playing calm/relaxing music/sounds, adjusting a temperature of a heating/cooling unit, offering nourishment, revisiting goals and benefits of arbitration, or providing other corrective actions. 5) A re-evaluation of the communication, behavior, or actions may be performed. If continued emotional escalation, hostility, or hazards of the arbitration is increased based on the communication, behavior, or actions, one or more additional corrective actions or intervening/de-escalation actions may be performed. For example, assuming playing of music fails to mitigate the negative impact of the communications, behavior, actions or events upon the one or more users, an additional corrective action may be recommended/applied such as, for example, requiring a time out of increased duration, changing of conflict resolution techniques or tactics by a conflict resolution entity (e.g., arbitrator), and/or even changing the conflict resolution entity (e.g., arbitrator).

Additionally, the cognitive conflict resolution service (e.g., the cognitive conflict resolution service 402 of FIG. 4) may include a corrective actions that ranks or prioritizes a list of items, objects, or interests to be discussed (in arbitration or counseling) as learned from previous and similar scenarios (e.g., learned from previous arbitration hearings, counseling sessions, etc.). Thus, the cognitive conflict resolution service may rank and prioritize an order of items, objects, or interests to be discussed (in arbitration or counseling) in order to proactively mitigate a possible negative impact of the communications, behavior, actions or events upon the one or more users if the interpreted appropriateness. For example, certain items of arbitration or counseling (e.g., dividing of vehicles) may be easier to negotiate that lead to early success (e.g., personal happiness and positive feeling/emotions) so that one upon negotiating of more difficult items (e.g., dividing of financial assets) each party is in a positive or "happy" emotional state.

The suggested optimal order for handling the list of items to be negotiated based on cognitive understanding of previous success rates (dynamic learning) may be dynamically and/or proactively provided. Even if a change in subject/topic is made that does not follow the optimal suggested negotiation list, the cognitive conflict resolution service may continuously and dynamically monitor and provide real-time updates of the next best topics (in order) to discuss.

6) A machine learning operation may be employed and used for modelling the monitored data and multi-class logistic regression with regularization. A multi-level neural networks machine learning classification model may also be used to categorize historical data and determine a next best or "optimal" action in order to take ameliorative actions. The parameters (e.g., corrective actions or list of items/topics/subjects of arbitration) may be used as inputs to the system in order to decide the best action which needs to be taken in order to pacify the surroundings. In one aspect, the parameters may include a list of items/topics/subjects of arbitration/emotion level and/or cognitive state, which are used to generate optimal corrective actions at an appropriate/right time.

7) Feedback data may be collected (in-real time) as part of reinforcement learning model of the machine learning operation. The collected feedback may be fed back into the cognitive conflict resolution service (e.g., the cognitive conflict resolution service 402 of FIG. 4) in order to provide real time input to a monitoring component (e.g., the monitoring component 420 of FIG. 4) and also provide real-time, reactive or predictive ameliorative action to appease a certain contextual situation.

In an addition embodiment, the cognitive conflict resolution service (e.g., the cognitive conflict resolution service 402 of FIG. 4) may dynamical provide or remind the participants (of the arbitration or counseling session, etc.) all the things they have in common (e.g., a voice active hub may access database 455 of FIG. 4 and identify common interest such as, for example, traveling, entertainment, likes, and/or even access a social media network to remind the parties of positive experiences (e.g., a vacation)).

Moreover, the cognitive conflict resolution service may play music or display pictures or videos on nearby IoT devices (e.g., UE 412) to attempt to pacify the situation. The cognitive conflict resolution service may interact with the parties (e.g., users 410A and 410B) by participating in the conversation offering interactive personal counseling messages. Based on the subject/topic of discussion, the cognitive conflict resolution service may identify the appropriate person (e.g., arbitrator, mediator, counselor, family member, associate/colleague, legal authority (e.g., a Judge)) to intervene to reduce a dispute or hostile behavior, while also initiating a communication message/alert (e.g., email) and/or telephone call to one or more appropriate persons (e.g., arbitrator, mediator, counselor, family member, associate/colleague, legal authority) reduce the dispute. The identification of the one or more appropriate persons may be performed based on knowledge in the area of discussion, availability of the person, or other means, etc.

The cognitive conflict resolution service may categorize the discussion content. Based on the pattern of discussion, the cognitive conflict resolution service may identify, if another party's involvement is required to address the possible negative impact of the communications, behavior, actions or events upon the one or more users and/or the intelligent may offer communications to attempt to mitigate the conflict (e.g., a voice-activated hub states "please, lower the tone or your voices and please do not interrupt the other party when they are speaking." The categorization of discussion content can be as follows: communication gaps, misunderstanding, ego, argument etc. Said differently, the content (which is the subject matter) may be classified based on some discrete categories such as, for example, a domestic violence, a misunderstanding of communication, communication gaps that involve resolving one or more discrete points to pacify responsible parties engaged in the argument, and the like. The topics of an argument needs to be understood (by content/conversation categorization under a certain topical subject matter) in order to take ameliorative actions or suggestion pacification strategy.). That is, using various kinds of content classification operation such as, for example, K-Means, one or more topics can be distilled from the conversation. If, for example, in a divorce mediation, the topics centered around the children like "custody," "visitation," "education," "child support," and emotional state of the involved parties are high, the present invention may suggest that a family counselor be pulled into the mediation to help determine what is fair, typical, or necessary to ensure the welfare of the children is protected. In one aspect, for known types of mediations a list of experts associated with various high stress topics may be provided and/or accessed for assistance. If another party is required during the conflict resolution event, the cognitive conflict resolution service may decide if remote participation (e.g., video or telephonic conference) or in person presence is required. Based on a determined seriousness of the discussion content, the cognitive conflict resolution service may identify one or more additional parties to participate (e.g., a voice-activated hub connects to a UE of another party (e.g., a close associate/friend of both parties or a Judge/Magistrate) and request their remote attendance to the arbitration hearing and immediately connects them to the arbitration. The cognitive conflict resolution service may also divert the current discussion topic to an alternative discussion topic such as, for example, by providing news, a comical video clip, or other non-related communication or actions.

Figure 5:
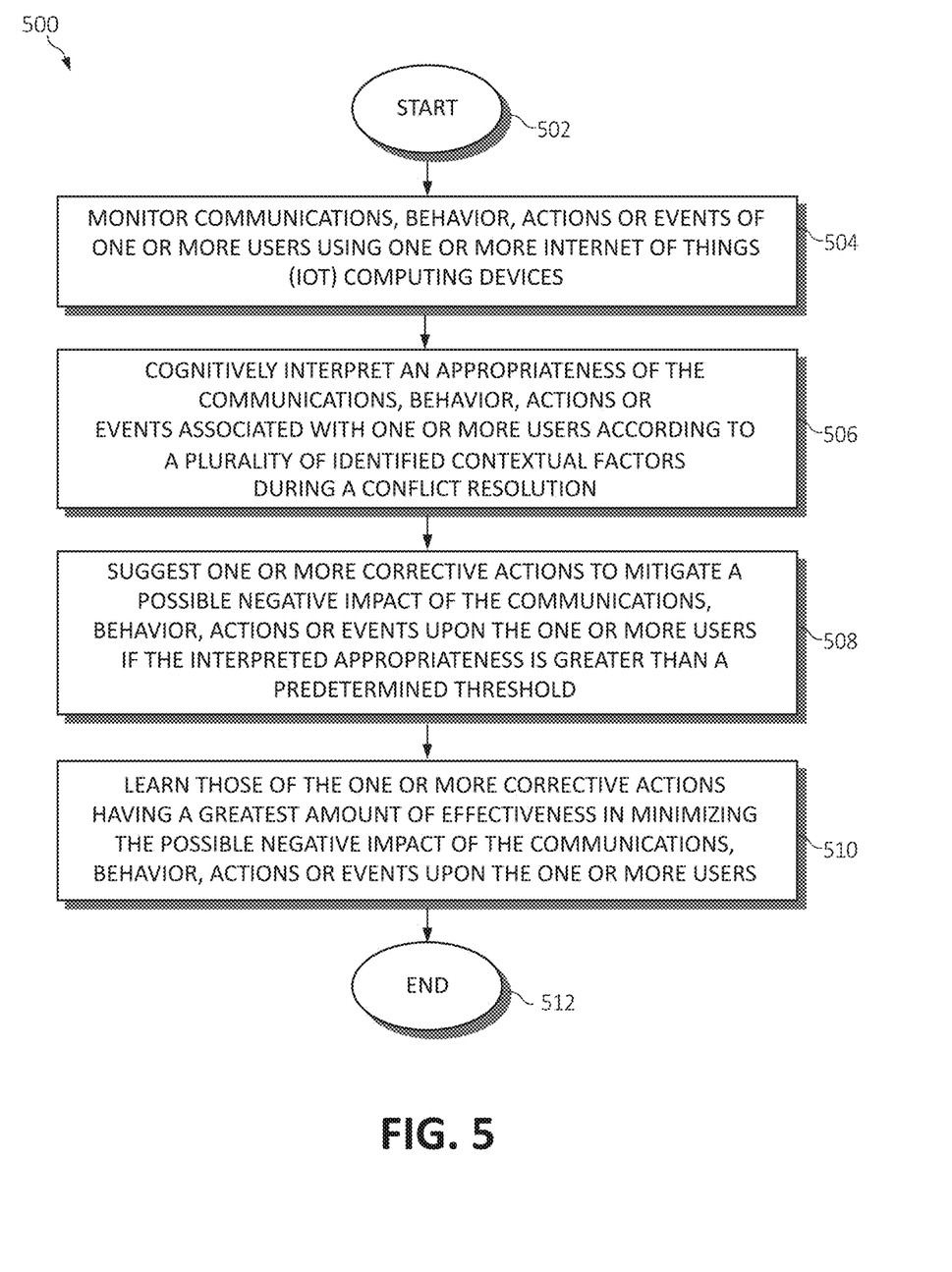
FIG. 5 is a flowchart diagram depicting an exemplary method for facilitating cognitive conflict resolution between parties in which various aspects of the present invention may be realized.

Turning now to FIG. 5, a method 500 for facilitating cognitive conflict resolution between parties in a computing environment is depicted, in which various aspects of the illustrated embodiments may be implemented. The functionality 500 may be implemented as a method executed as instructions on a machine, where the instructions are included on at least one computer readable medium or on a non-transitory machine-readable storage medium.

The functionality 500 may start in block 502. Communications, behavior, actions or events associated with one or more users may be monitored using one or more IoT computing devices, as in block 504. An appropriateness of the communications, behavior, actions or events associated with the one or more users may be cognitively interpreted according to a plurality of identified contextual factors during a conflict resolution (e.g., an arbitration hearing event, etc.), as in block 506. One or more corrective actions may be suggested to mitigate a possible negative impact of the communications, behavior, actions or events upon the one or more users if the interpreted appropriateness is less than a predetermined threshold, as in block 508. Those of the one or more corrective actions having a greatest amount of effectiveness in minimizing the possible negative impact of the communications, behavior, actions or events upon the one or more users may be identified and learned, as in block 510. The functionality 500 may end in block 512.

Figure 6:
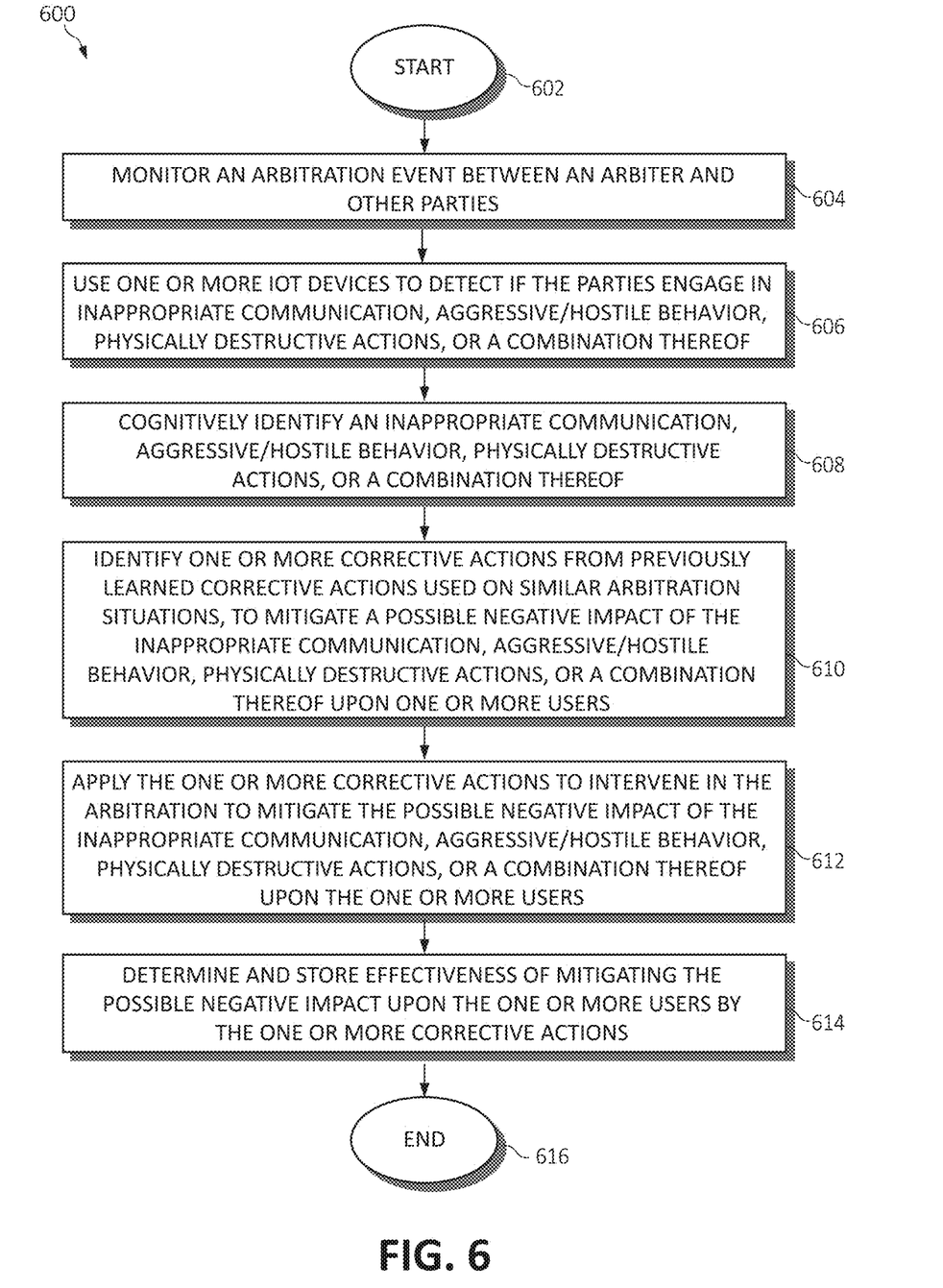
FIG. 6 is an additional flowchart diagram depicting an exemplary method for facilitating cognitive conflict resolution between parties, again in which various aspects of the present invention may be realized.

Turning now to FIG. 6, a method 600 for facilitating cognitive conflict resolution between parties in a computing environment is depicted, in which various aspects of the illustrated embodiments may be implemented. The functionality 600 may be implemented as a method executed as instructions on a machine, where the instructions are included on at least one computer readable medium or on a non-transitory machine-readable storage medium.

The functionality 600 may start in block 602. An arbitration (e.g., an arbitration between two or more persons, businesses, organizations, etc.) between an arbiter and other parties, may be monitored, as in block 604. One or more IoT devices may be used to detect if the other parties engage in inappropriate communication, aggressive/hostile behavior, physically destructive actions, or a combination thereof, as in block 606. An inappropriateness of the communication, aggressive/hostile behavior, physically destructive actions, or a combination may be cognitively identified, as in block 608. One or more corrective actions from previously learned corrective actions used on similar arbitration situations may be identified to mitigate a possible negative impact of the inappropriate communication, aggressive/hostile behavior, physically destruction actions, or a combination thereof upon the one or more users, as in block 610. The one or more corrective actions may be applied to intervene in the arbitration to mitigate the possible negative impact of the inappropriate communication, aggressive-'hostile behavior, physically destructive actions, or a combination thereof upon the one or more users, as in block 612. An effectiveness of mitigating the possible negative impact upon the one or more users by the one or more corrective actions may be determined and stored, as in block 614. The functionality 600 may end in block 616.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for facilitating cognitive conflict resolution between parties by a processor, comprising:
monitoring communications, behavior, actions or events of one or more users during a conflict resolution session using one or more internet of things (IoT) computing devices;
cognitively interpreting an appropriateness of the communications, behavior, actions or events associated with the one or more users according to a plurality of identified contextual factors during the conflict resolution session;
suggesting one or more corrective actions to mitigate a possible negative impact of the communications, behavior, actions or events upon the one or more users if the interpreted appropriateness is less than a predetermined threshold, wherein the one or more users comprise a plurality of users, and wherein suggesting at least one of the one or more corrective actions includes accessing a social media network account of each of the plurality of users, analyzing posts to each respective social media account to identify interests or experiences common to each of the plurality of users, and generating an aural indication by the one or more IoT computing devices of the interests or experiences common to each of the plurality of users;
initializing a machine learning mechanism to collect feedback data from the one or more users and learn the one or more corrective actions having a greatest amount of effectiveness in minimizing the possible negative impact of the communications, behavior, actions or events upon the one or more users during the conflict resolution session, wherein the feedback data is collected and analyzed in real-time such that, when it is determined a first action of the suggested one or more corrective actions taken during the conflict resolution session fails to mitigate the possible negative impact of the communications, a second action of the one or more corrective actions is suggested during the conflict resolution session while simultaneously learning, by the machine learning mechanism, that the first action taken produced an unsuccessful result and contextual information occurring during the unsuccessful result;

training a classifier of the machine learning mechanism using the feedback data from the one or more users and the learned one or more corrective actions having the greatest amount of effectiveness in minimizing the possible negative impact of the communications, behavior, actions or events upon the one or more users during the conflict resolution session; and using an output of the machine learning mechanism having the trained classifier during a subsequent conflict resolution session to rank a pre-existing list of items to be discussed during the subsequent conflict resolution session in an order which is most likely to mitigate the appropriateness of the communications, behavior, actions or events from falling below the predetermined threshold, wherein the ranking is updated in real-time notwithstanding whether additional items are interjected into the conflict resolution session by the one or more users during the discussion of the pre-existing list of items.

2. The method of claim 1, wherein cognitively interpreting the appropriateness of the communications based on the plurality of identified contextual factors further includes interpreting legal, ethical, moral, behavior, emotion, hazards, hostility, or courteous ones of the contextual factors in view of the communications, behavior, actions or events.

3. The method of claim 1, further including analyzing related and similar communications, behaviors, actions or events to determine if an identified contextual factor in the related and similar communications, behaviors, actions or events is similar to one of the identified contextual factors in the communications, behaviors, actions or events.

4. The method of claim 1, further including implementing a series of corrective actions to de-escalate the possible negative impact of the communications, behavior, actions or events upon the one or more users based on the identified contextual factors.

5. The method of claim 1, further including identifying an increase in hostility, a negative emotional response, or combination thereof of the one or more users in response to the communications, behavior, actions or events.

6. A system for facilitating cognitive conflict resolution between parties, comprising:
one or more computers with executable instructions that when executed cause the system to:
monitor communications, behavior, actions or events of one or more users during a conflict resolution session using one or more internet of things (IoT) computing devices;
cognitively interpret an appropriateness of the communications, behavior, actions or events associated with the one or more users according to a plurality of identified contextual factors during the conflict resolution session;
suggest one or more corrective actions to mitigate a possible negative impact of the communications, behavior, actions or events upon the one or more users if the interpreted appropriateness is less than a predetermined threshold, wherein the one or more users comprise a plurality of users, and wherein suggesting at least one of the one or more corrective actions includes accessing a social media network account of each of the plurality of users, analyzing posts to each respective social media account to identify interests or experiences common to each of the plurality of users, and generating an aural indication by the one or more IoT computing devices of the interests or experiences common to each of the plurality of users;
initialize a machine learning mechanism to collect feedback data from the one or more users and learn the one or more corrective actions having a greatest amount of effectiveness in minimizing the possible negative impact of the communications, behavior, actions or events upon the one or more users during the conflict resolution session, wherein the feedback data is collected and analyzed in real-time such that, when it is determined a first action of the suggested one or more corrective actions taken during the conflict resolution session fails to mitigate the possible negative impact of the communications, a second action of the one or more corrective actions is suggested during the conflict resolution session while simultaneously learning, by the machine learning mechanism, that the first action taken produced an unsuccessful result and contextual information occurring during the unsuccessful result;
train a classifier of the machine learning mechanism using the feedback data from the one or more users and the learned one or more corrective actions having the greatest amount of effectiveness in minimizing the possible negative impact of the communications, behavior, actions or events upon the one or more users during the conflict resolution session; and
use an output of the machine learning mechanism having the trained classifier during a subsequent conflict resolution session to rank a pre-existing list of items to be discussed during the subsequent conflict resolution session in an order which is most likely to mitigate the appropriateness of the communications, behavior, actions or events from falling below the predetermined threshold, wherein the ranking is updated in real-time notwithstanding whether additional items are interjected into the conflict resolution session by the one or more users during the discussion of the pre-existing list of items.

7. The system of claim 6, wherein the executable instructions, pursuant to cognitively interpreting the appropriateness of the communications, behavior, actions or events based on the plurality of identified contextual factors further interpret legal, ethical, moral, behavior, emotion, hazards, hostility, or courteous ones of the contextual factors in view of the communications, behavior, actions or events.

8. The system of claim 6, wherein the executable instructions further analyze related and similar communications, behaviors, actions or events to determine if an identified contextual factor in the related and similar communications, behaviors, actions or events is similar to one of the identified contextual factors in the communications, behaviors, actions or events.

9. The system of claim 6, wherein the executable instructions further implement a series of the corrective actions to de-escalate the possible negative impact of the communications, behavior, actions or events upon the one or more users based on the identified contextual factors.

10. The system of claim 6, wherein the executable instructions further identify an increase in hostility, a negative emotional response, or combination thereof of the one or more users in response to the communications, behavior, actions or events.

11. A computer program product for, by a processor, reusing application solutions for an application the computer program product comprising a non-transitory computer-readable storage medium having computer-readable program code portions stored therein, the computer-readable program code portions comprising:

an executable portion that monitors communications, behavior, actions or events of one or more users during a conflict resolution session using one or more internet of things (IoT) computing devices;

an executable portion that cognitively interprets an appropriateness of the communications, behavior, actions or events associated with the one or more users according to a plurality of identified contextual factors during the conflict resolution session;

an executable portion that suggests one or more corrective actions to mitigate a possible negative impact of the communications, behavior, actions or events upon the one or more users if the interpreted appropriateness is less than a predetermined threshold, wherein the one or more users comprise a plurality of users, and wherein suggesting at least one of the one or more corrective actions includes accessing a social media network account of each of the plurality of users, analyzing posts to each respective social media account to identify interests or experiences common to each of the plurality of users, and generating an aural indication by the one or more IoT computing devices of the interests or experiences common to each of the plurality of users;

an executable portion that initializes a machine learning mechanism to collect feedback data from the one or more users and learn the one or more corrective actions having a greatest amount of effectiveness in minimizing the possible negative impact of the communications, behavior, actions or events upon the one or more users during the conflict resolution session, wherein the feedback data is collected and analyzed in real-time such that, when it is determined a first action of the suggested one or more corrective actions taken during the conflict resolution session fails to mitigate the possible negative impact of the communications, a second action of the one or more corrective actions is suggested during the conflict resolution session while simultaneously learning, by the machine learning mechanism, that the first action taken produced an unsuccessful result and contextual information occurring during the unsuccessful result;

an executable portion that trains a classifier of the machine learning mechanism using the feedback data from the one or more users and the learned one or more corrective actions having the greatest amount of effectiveness in minimizing the possible negative impact of the communications, behavior, actions or events upon the one or more users during the conflict resolution session; and an executable portion that uses an output of the machine learning mechanism having the trained classifier during a subsequent conflict resolution session to rank a pre-existing list of items to be discussed during the subsequent conflict resolution session in an order which is most likely to mitigate the appropriateness of the communications, behavior, actions or events from falling below the predetermined threshold, wherein the ranking is updated in real-time notwithstanding whether additional items are interjected into the conflict resolution session during the discussion of the pre-existing list of items.

12. The computer program product of claim 11, further including an executable portion that, pursuant to cognitively interpreting the appropriateness of the communications, behavior, actions or events based on the plurality of identified contextual factors, further interprets legal, ethical, moral, behavior, emotion, hazards, hostility, or courteous ones of the contextual factors in view of the communications, behavior, actions or events.

13. The computer program product of claim 11, further including an executable portion that analyzes related and similar communications, behaviors, actions or events to determine if an identified contextual factor in the related and similar communications, behaviors, actions or events is similar to one of the identified contextual factors in the communications, behaviors, actions or events.

14. The computer program product of claim 11, further including an executable portion that implements a series of corrective actions to de-escalate the possible negative impact of the communications, behavior, actions or events upon the one or more users based on the identified contextual factors.

15. The computer program product of claim 11, further including an executable portion that identifies an increase in hostility, a negative emotional response, or combination thereof of the one or more users in response to the communications, behavior, actions or events.

* * * * *